United States Patent [19]

Vanselous

[11] Patent Number: 4,637,281
[45] Date of Patent: Jan. 20, 1987

[54] CONTROL VALVE SYSTEM FOR A FOUR-SPEED AUTOMATIC POWER TRANSMISSION TRANSAXLE

[75] Inventor: Joseph S. Vanselous, West Bloomfield, Mich.

[73] Assignee: Ford Motor Company, Dearborn, Mich.

[21] Appl. No.: 756,629

[22] Filed: Jul. 19, 1985

[51] Int. Cl.$^4$ .............................................. B60K 41/16
[52] U.S. Cl. ......................................... 74/869; 74/867
[58] Field of Search .......................... 74/869, 868, 867

[56] References Cited

U.S. PATENT DOCUMENTS

| | | | |
|---|---|---|---|
| 3,309,939 | 3/1967 | Pierce, Jr. | 74/472 |
| 3,327,554 | 6/1967 | Searles | 74/472 |
| 3,344,681 | 10/1967 | Searles | 74/472 |
| 3,400,612 | 9/1968 | Pierce, Jr. | 74/864 |
| 3,613,484 | 10/1971 | Pierce et al. | 74/869 |
| 4,331,046 | 5/1982 | Leonard et al. | 74/869 X |
| 4,413,536 | 11/1983 | Whitney et al. | 74/869 |
| 4,432,255 | 2/1984 | Borman et al. | 74/869 |
| 4,509,389 | 4/1985 | Vahratian et al. | 74/695 |

*Primary Examiner*—Kenneth J. Dorner
*Assistant Examiner*—Dirk Wright
*Attorney, Agent, or Firm*—Donald J. Harrington; Keith L. Zerschling

[57] ABSTRACT

A control valve system for a four speed automatic transmission wherein a single valve mechanism acts in combination with a 2-3 shift valve, a 3-4 shift valve and a torque sensor throttle valve to control heavy throttle 2-3 upshifts, light throttle 2-3 upshifts, light throttle 3-4 upshifts, heavy throttle 3-4 upshifts, heavy throttle 3-2 downshifts and coasting downshifts to provide maximum smoothness in the engagement and release of fluid pressure operated ratio control servos.

6 Claims, 12 Drawing Figures

FIG. 1.

| Gear | $C_1$ | $C_2$ | $C_3$ | $C_4$ | $B_1$ | $B_2$ | Drive | | Coast | | Ratio |
|---|---|---|---|---|---|---|---|---|---|---|---|
| | | | | | | | $OWC_1$ | $OWC_2$ | $OWC_1$ | $OWC_2$ | |
| 1M | X | | X | | | X | X | | | X | 2.779 |
| 1D | X | | | | | X | X | | | O/R | 2.779 |
| 2 | X | X | | | | X | O/R | | | O/R | 1.512 |
| 3 | X | X | X | | | | | X | X | | 1.000 |
| 4 | | X | X | X | | | | O/R | | O/R | .712 |
| R | X | | X | X | X | | X | | | X | 2.474 |

CONTROL VALVE SYSTEM FOR A FOUR-SPEED AUTOMATIC POWER TRANSMISSION TRANSAXLE

GENERAL DESCRIPTION OF THE INVENTION

This invention comprises improvements in a control valve system such as that shown in copending application Ser. No. 713,356, filed Mar. 18, 1985, by J. S. Vanselous, which is assigned to the assignee of this invention. The control circuit of this invention may be used to control ratio changes in a transaxle structure such as that shown in Vahratian et al U.S. Pat. No. 4,509,389, dated Apr. 9, 1985, which is assigned to the assignee of this invention.

Like the control circuit shown in application Ser. No. 713,356, the disclosure of this application relates to valve circuitry for controlling the application and release of clutches and brakes to establish four forward driving ratios in the transmission structure of U.S. Pat. No. 4,509,389. The control circuitry includes a fluid pressure pump driven by the engine for a wheeled vehicle driveline and fluid pressure operated servos for controlling the application and release of friction clutches and brakes. The transmission includes a low and intermediate brake servo and overdrive brake servo, a forward drive friction clutch, an intermediate drive friction clutch, and a direct drive friction clutch. Separate shift valves are provided for establishing ratio changes between the first and second ratios, between the second and third ratios, and between the third and fourth ratios, the fourth ratio being an overdrive ratio.

The third speed ratio is a direct drive ratio in which torque transferred from the turbine shaft of the converter is distributed to the torque input side of the gearing which is conditioned for a one-to-one operating ratio. This direct drive condition is achieved as the direct drive clutch is engaged and the intermediate speed ratio brake is released. The intermediate speed ratio brake includes a brake band that engages the reaction element of the gearing during intermediate speed ratio operation, the brake band servo being divided into two regions identified in the disclosure as a servo brake release region and a servo brake apply region. When both regions are pressurized, the intermediate speed ratio servo is released. As the release region is exhausted, the intermediate brake band servo becomes applied. In this respect the intermediate servo functions in a manner similar to the intermediate servo disclosed in U.S. Pat. No. 3,309,939, issued to Stanley L. Pierce. That patent also is assigned to the assignee of this invention.

It is common practice (as shown, for example, in the Pierce patent) to hydraulically connect the direct drive clutch with the release region of the intermediate servo so that when the clutch becomes applied or pressurized, the intermediate servo becomes released in synchronism with the application of the clutch. Likewise a downshift from the direct drive to the intermediate ratio is achieved by exhausting the direct clutch and the release side of the intermediate servo.

The shift valves that control the ratio changes respond to a throttle pressure, which is a measure of the torque delivered by the transmission, and governor pressure, which is a function of the driven speed of the driven shaft for the transmission. Heavy throttle upshifts thus are delayed relative to light throttle upshift because of the influence of the throttle pressure on the shift valves which opposes the force applied to the shift valves by the governor pressure. Control pressure is applied to the shift valves by a driver operated manual valve, which permits the driver to select the various drive ranges.

In order to effect a smooth ratio change from the intermediate ratio to the direct drive ratio under both heavy throttle conditions and light throttle conditions, it is necessary to provide a so-called backout valve which delays the application of the direct drive clutch and the release of the intermediate servo following shifting movement of the shift valve that controls 2-3 upshifts. This is done by providing a controlled flow restriction in the direct clutch servo and intermediate brake servo exhaust flow path. In this manner the application of the direct drive clutch is cushioned and its engagement is synchronized with the release of the intermediate brake so that harshness in light throttle upshifts is avoided. The flow restriction provided by the backout valve is removed or reduced during 2-3 heavy throttle upshifts.

The improvements of this invention include a backout valve that performs the function of known backout valve arrangements such as that shown in the Pierce U.S. Pat. No. 3,309,939 as well as Searles U.S. Pat. No. 3,344,681; Searles U.S. Pat. No. 3,327,554; Pierce U.S. Pat. No. 3,400,612; and Pierce et al U.S. Pat. No. 3,613,484. Each of these patents is assigned to the assignee of this invention. The present invention is distinguished from these prior art valve systems by incorporating a backout valve in combination with the shift valves in such a way that the backout valve is capable of controlling light throttle 3-4 upshifts, heavy throttle 3-4 upshifts, a power-on 3-2 downshift, and light throttle downshifts which force the valve circuit under light throttle operation to downshift from the third ratio to the first ratio and to skip the intermediate step of downshifting from the third ratio to the second ratio. These multiple functions have been added to the usual backout arrangement of the prior art systems without adding to the complexity of the valve circuit and without the necessity for adding to the valve circuit unique valve elements for performing the separate additional functions.

BRIEF DESCRIPTION OF THE FIGURES OF THE DRAWINGS

FIG. 5 is an enlarged schematic view of the backout valve portion of the control valve circuit of FIGS. 4A through 4D.

PARTICULAR DESCRIPTION OF THE VALVE CIRCUIT OF FIGS. 4A THROUGH 4D

Figure 1:
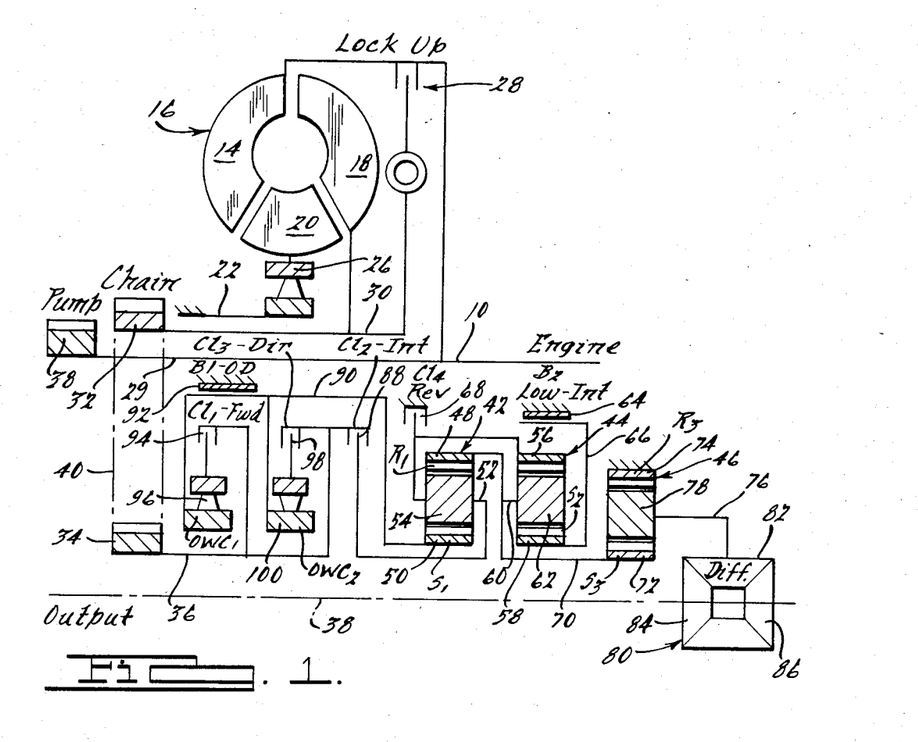
FIG. 1 shows a schematic view of the hydrokinetic torque converter and gearing arrangement for the transmission system that is capable of embodying the improved valve circuitry of my invention.
Figure 3:
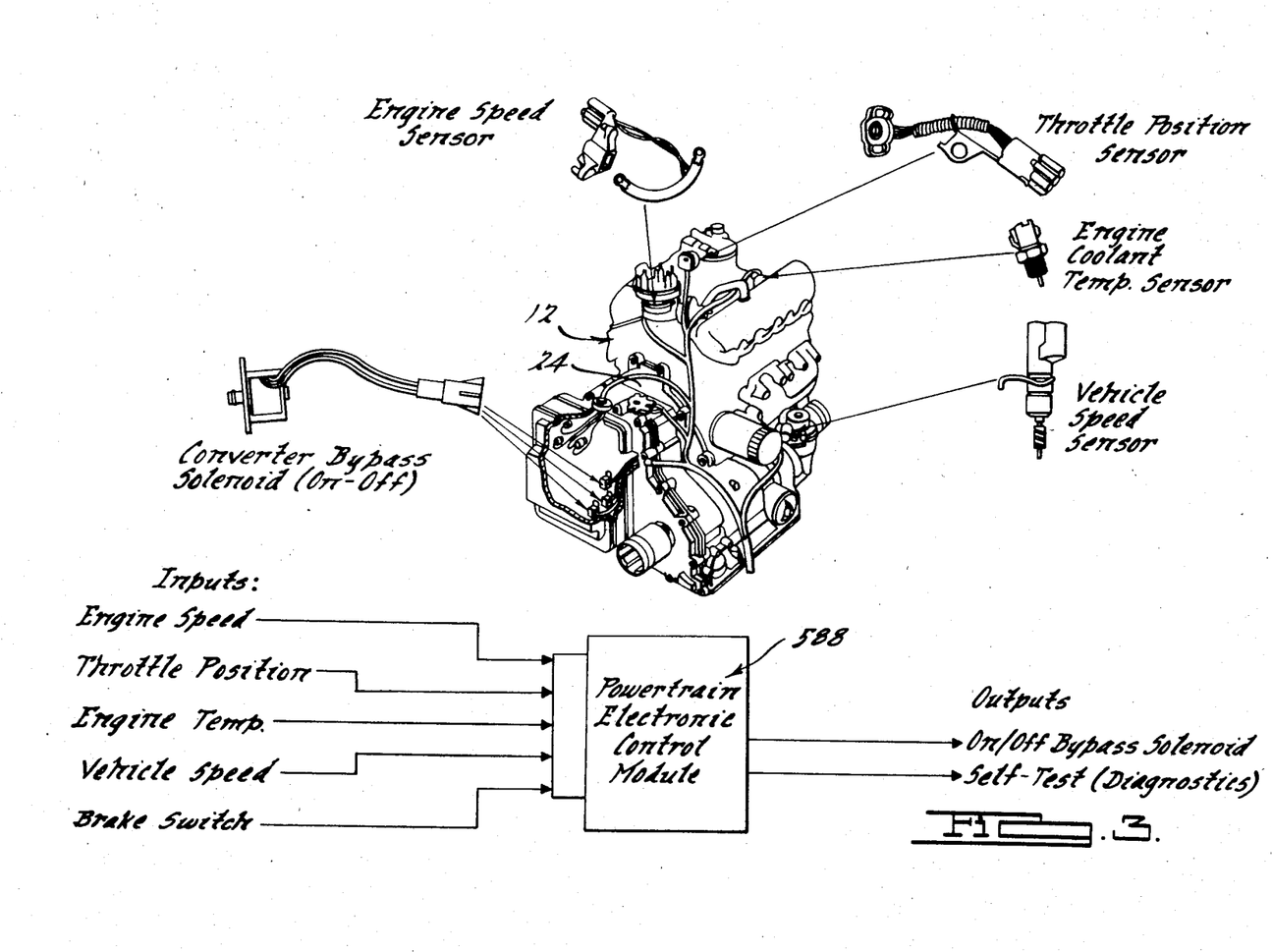
FIG. 3 is a schematic representation showing the power train electronic control module that is used to control the converter bypass solenoid.

In FIG. 1 numeral 10 designates the crankshaft of an internal combustion engine shown schematically in FIG. 3 at 12. Crankshaft 10 is connected to the impeller 14 of a hydrokinetic torque converter 16. The converter 16 includes also a bladed turbine 18 and a bladed stator 20, the latter being located between the torus flow outlet section of the turbine 18 and the torus flow inlet section of the impeller 14. The stator 20 is supported by a stationary sleeve shaft 22 connected to the transmission housing shown at 24 in FIG. 3. An overrunning brake 26 is situated between the bladed section of the stator 20 and the stationary sleeve shaft 22. Overrunning brake 26 permits freewheeling motion of the stator 20 in the direction of rotation of the impeller, but it prevents rotation in the opposite direction.

A torque converter lockup clutch 28 is adapted to establish a driving connection between the impeller 14 and turbine shaft 30, the latter being connected to the bladed impeller 18. For a complete description of the mode of operation of the clutch 28, reference may be made to the previously identified Vahratian et al patent.

The engine crankshaft 10 is connected to a pump driveshaft 29, which drives a variable displacement pump 38 for the automatic transmission control system to be described with reference to FIGS. 4A through 4D. Turbine shaft 30, which is a sleeve shaft surrounding driveshaft 29, serves as a torque input shaft for a drive sprocket 32. A driven sprocket 34 is connected to torque input shaft 36 for multiple ratio gearing disposed about the output shaft axis 38. Axis 38 is parallel and laterally offset with respect to the engine crankshaft. Drive chain 40 serves as a torque transfer member that connects drivably the drive sprocket 32 with the driven sprocket 34.

The multiple ratio gearing comprises a pair of simple planetary gear units 42 and 44 as well as a final drive planetary gear unit 46. Gear unit 42 includes ring gear 48, sun gear 50, a planetary carrier 52 and multiple planet pinions 54 which are journalled on carrier 52 so that they mesh with ring gear 48 and sun gear 50.

Carrier 52 is connected directly to ring gear 56 of the planetary gear unit 44. Gear unit 44 includes also sun gear 58, planetary carrier 60 and planet pinions 62 journalled on carrier 60 so that they mesh with ring gear 56 and sun gear 58.

Sun gear 58 is adapted to be braked by a low and intermediate brake band 64 which surrounds brake drum 66 connected to the sun gear 58. The low and intermediate brake 64 carries the notation $B_2$ in FIG. 1 as well as in the chart of FIG. 2.

A reverse brake 68 selectively brakes the ring gear 56 and the carrier 52 which are connected together as explained. Brake 68 in FIG. 2 carries the notation $CL_4$ in FIG. 1 as well as in the chart of FIG. 2.

Carrier 60 is connected to torque output shaft 70 for the planetary gearing. Shaft 70 is connected to sun gear 72 of the final drive planetary gear unit 46. Gear unit 46 includes also ring gear 74 which is held stationary by the transmission housing. Gear unit 46 includes also carrier 76 which journals pinions 78 that mesh with ring gear 74 and sun gear 72. Carrier 76 is connected to the differential carrier of a differential gear unit 80. The differential carrier has pinions 82 journalled thereon, and these are connected drivably to the carriers 76.

Differential gear unit 80 includes also side gears 84 and 86. Each side gear is connected to a separate torque output half-driveshaft, the outboard ends of the driveshafts being connected to the vehicle traction wheels. A universal joint, not shown, connects one end of each half shaft with its associated side gear and the outboard end of that half shaft is connected to its associated traction wheel by a second universal joint, not shown.

The input sleeve shaft 36 is connected to the carrier 52 of gear unit 42 through an intermediate speed ratio clutch 88. That clutch is identified by the symbol $CL_2$ in FIG. 1 as well as in the chart of FIG. 2. Sun gear 50 of the gear unit 42 is connected to brake drum 90 about which is positioned overdrive brake band 92. Brake band 92 is identified by the symbol $B_1$ in FIG. 1 as well as in the chart of FIG. 2. Sun gear 50 and brake drum 90 to which it is connected is connected to input shaft 36 through forward clutch 94 and overrunning clutch 96 situated in series relationship. Clutch 94 is identified by the symbol $CL_1$ in FIG. 1 as well as in the chart of FIG. 2. The overrunning clutch 96 is identified by the symbol $OWC_1$ in FIG. 1 as well as in the chart of FIG. 2.

A direct drive clutch 98 and a second overrunning clutch 100, which are arranged in series relationship, connect input shaft 36 with the brake drum 90 and the sun gear 50. The symbol $CL_3$ identifies the direct drive clutch in FIG. 1 as well as in the chart of FIG. 2. A second overrunning clutch is identified by the symbol $OWC_2$ in FIG. 1 as well as in the chart of FIG. 2.

By engaging selectively the clutches and the brakes, four forward driving speed ratios can be achieved as well as a single reverse speed ratio. The forward clutch 94 is engaged during operation in the first three forward driving ratios and the intermediate clutch 88 is engaged the second, third and fourth forward driving ratios. Direct drive clutch 98 is engaged during operation in the third and fourth forward driving ratios as well as the reverse driving ratio. It is engaged also during manual low operation to effect a bypass around the overrunning clutch 100 during engine braking.

Sun gear 50 acts as a reaction member during overdrive operation. It is braked by overdrive brake band 92 which is applied during fourth ratio operation. Low and intermediate brake band 64 is applied during operation in low and intermediate operation.

Figure 2:
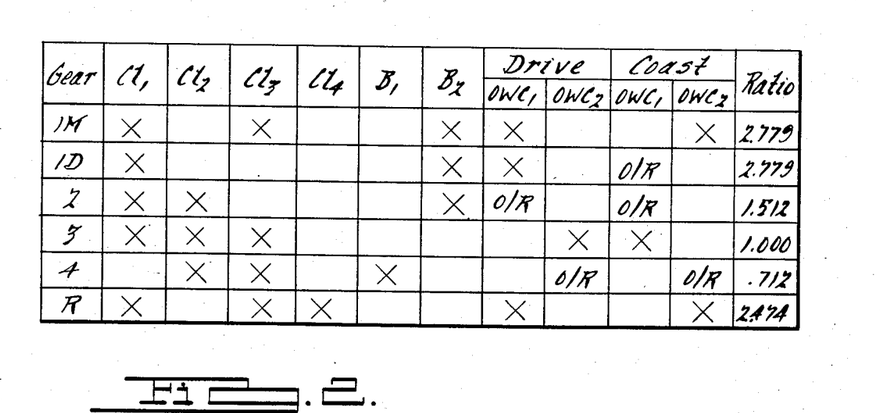
FIG. 2 is a chart that shows the clutch and brake engagement and release pattern for the clutches and brakes shown in FIG. 1.

In the chart of FIG. 2 the clutch engagement and release pattern is indicated. A symbol "X" is used to define an engaged clutch or brake. The symbol O/R is used to indicate an overrunning condition for the appropriate overrunning clutch.

In the control system shown in FIGS. 4A through 4D the valves and the clutch and brake servos are supplied with fluid pressure developed by a positive displacement pump 38 having a variable displacement characteristic. Pump 38 communicates at its outlet side with a high pressure supply passage 102 and it communicates at its low pressure inlet side with a transmission sump 104. The pump 38 includes a stator ring 106 which is pivoted at 108 to provide a variable displacement control. The angle to which the stator 106 ring is adjusted with respect to the pivot 108 is dependent upon the pressure supplied to one side of the stator ring through a pump control passage 110. The force created by the pressure in passage 110 is opposed by compression spring 112. For a further understanding of the mode of operation of variable displacement pumps of this kind, reference may be made to U.S. Pat. No. 3,656,869 issued to Alan S. Leonard and to U.S. Pat. No. 4,342,545 issued to David A. Schuster.

High pressure line pressure passage 102 supplies line pressure to a main regulator and boost valve assembly 114 which regulates the pressure to a calibrated value as will be explained subsequently. The output pressure of the main regulator and boost valve 114 is supplied through passage 102 to a manual valve assembly 116, which is under the control of the vehicle operator and which permits the operator to select any one of several operating modes. These operating modes are identified in FIG. 4A by the symbols L, D, OD, N and R which designate, respectively, the manual valve positions for low or manual drive mode, the three speed automatic drive range mode, the four speed overdrive range mode, neutral condition and reverse drive.

The manual valve 116, as explained subsequently, delivers working pressure to the three shift valves that control the ratio changes. These are the 1-2 shift and 1-2 throttle delay valve assembly 118 shown in FIG. 4C, the 2-3 shift and TV modulator valve assembly 120 for 2-3 shifts and 3-2 shifts shown in FIG. 4C, the 3-4 shift and modulator valve assembly 122 for 3-4 shifts and 4-3 shifts and the vehicle speed governor assembly 124 shown in FIG. 4C. High pressure is supplied by passage 102 also to an accumulator regulator valve assembly 126. Valve assembly 126 provides a cushioned engagement of the overdrive brake $B_1$ on a 3-4 upshift. It provides a relatively steep linear relationship of pressure in the overdrive brake with respect to time and a corresponding relationship for the rate of pressure build up in the intermediate clutch $CL_2$. Valve assembly 126 controls also the engagement of the intermediate clutch $CL_2$ on a 1-2 upshift.

Figure 4A:
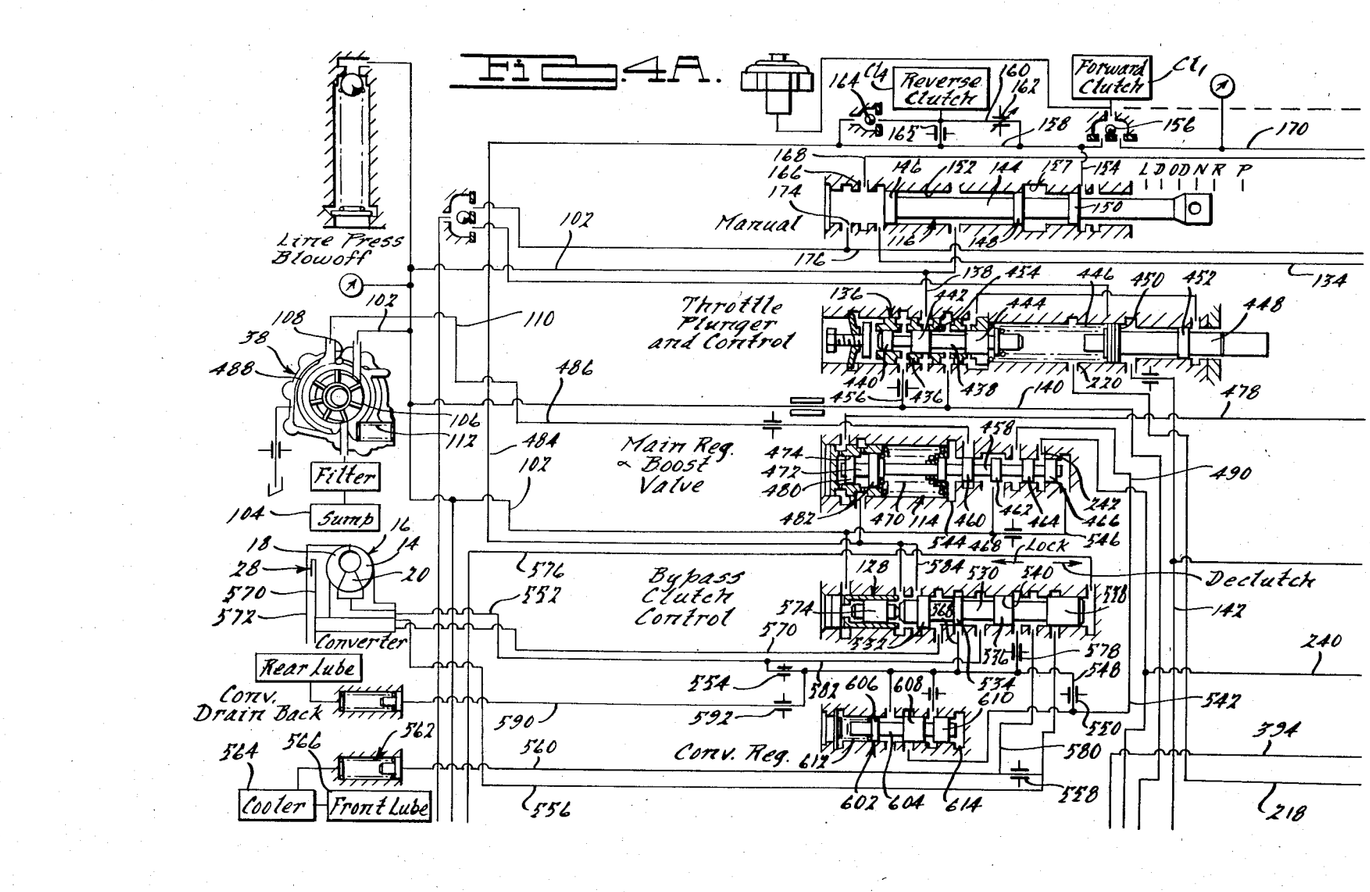
FIGS. 4A, 4B, 4C and 4D collectively show the hydraulic control valve circuitry for controlling the transmission structure of FIG. 1, each view showing a separate section of the circuitry.

The bypass clutch control valve assembly 128 is supplied with control pressure from a passage 102 as seen in FIG. 4A. The bypass clutch control regulates the engagement and release of the lockup clutch 28 seen schematically in FIG. 1. The function of the bypass clutch control will be described particularly later in this specification.

For a particular description of a governor capable of functioning with the characteristic of governor 124, reference may be made to U.S. Pat. No. 4,323,093 issued to Douglas A. Whitney and U.S. Pat. No. 3,559,667 issued to Erkki A. Kolvunen.

Figure 4B:
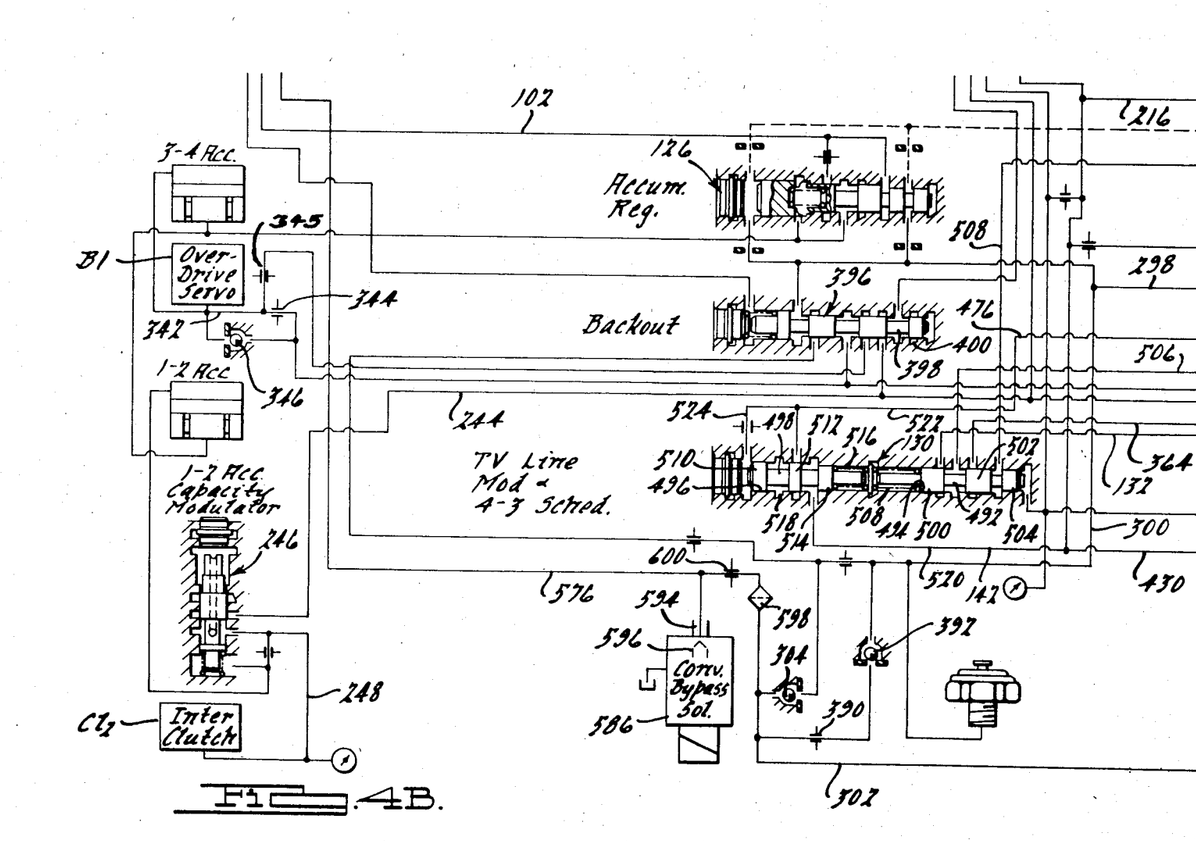

In FIG. 4B there is shown a TV modulator and 4-3 scheduling valve assembly 130. Line pressure is distributed to the valve assembly 128 through line pressure passage 132 which communicates with passage 134 shown in FIGS. 4A and 4C. Passage 134 in turn is supplied with line pressure by the manual valve assembly 116 when the manual valve assembly is in a condition for overdrive operation corresponding to position OD, when it is positioned for automatic drive range position corresponding to manual valve position D and when it is conditioned for manual-low operation corresponding to manual valve position L.

A throttle plunger and control valve assembly 136, shown in FIG. 4A, is supplied with fluid from line pressure passage 102 through passage 138. Output pressure from the throttle plunger and control valve assembly 136 delivers a throttle valve pressure signal to passage 140, which extends to the previously described TV line modulator and 4-3 scheduling valve assembly 130. The output of valve assembly 130 is distributed to passage 142 which extends to the 1-2 shift and 1-2 throttle delay valve assembly 118 for delaying 1-2 upshifts, to the 2-3 shift and throttle valve pressure modulator valve assembly 120 for delaying 2-3 upshifts and to the 3-4 shift and TV modulator valve assembly 122 for delaying 3-4 upshifts.

Each valve assembly discussed in the foregoing description now will be described with more detail.

MANUAL VALVE ASSEMBLY

Valve assembly 116 comprises a multiple land valve spool 144 having spaced valve lands 146, 148 and 150. Valve spool 144 is positioned in a valve chamber 152 which is provided with internal valve lands that register with the external valve lands of the valve spool. Valve plunger 144 can be positioned axially with respect to the internal valve lands in any one of the positions indicated by the symbols L, D, OD and R. In FIG. 4A valve spool 144 is shown in the neutral position N.

When the manual valve spool 144 is positioned as shown, distribution of pressure from the supply passage 102 to the various valve ports is blocked by lands 146 and 148. When the valve spool 144 is positioned in the reverse position R, communication is established between supply passage 102 and reverse line pressure passage 154 as fluid pressure is distributed across land 148, which registers with axially elongated valve groove 157. The pressure in passage 154 causes double position check valve 156 to shift to its right hand position establishing communication between passage 154 and forward clutch $CL_1$. Pressure is transferred also from passage 154 to the reverse clutch $CL_4$ through passage 158 and passage 160. Passage 158 and 160 are parallel. Passage 160 is provided with an orifice 162 which is thermostatically controlled so that it is less restrictive when the transmission fluid is cold and more restrictive when it is hot. A parallel orifice 164 in passage 158 is a fixed size orifice. Thus the engagement time for the reverse clutch $CL_4$ is not unduly prolonged because of low temperature of the oil. When the clutch $CL_4$ is applied, one-way check valve 164 closes thereby preventing rapid filling of the servo for the reverse clutch. When the clutch is released, however, passage 158 communicates with the reverse clutch through the one-way check valve 164, thereby permitting rapid exhaust of the clutch $CL_4$ through passage 158 and through the right hand end of the manual valve chamber 152, which is open to the transmission sump.

If the manual valve spool 144 is shifted to the position OD, passage 102 communicates with passage 134 through the portion of the valve chamber 152 intermediate lands 146 and 148. Passage 134, as mentioned previously, communicates with passage 132, which in turn communicates with passage 166 leading to the 1-2 shift and 1-2 throttle delay valve assembly 118.

When the manual valve is moved to the D position, passage 134 continues to be pressurized through the same pressure delivery route. Passage 154 continues to be exhausted through the right hand end of the valve chamer 152. Land 146 moves to the left hand side of port 166 thereby establishing communication between passage 102 and passage 168. Since passage 154 is exhausted, the double position check valve 156 shifts to its left hand position and the forward clutch $CL_1$ communicates with passage 170. Passage 168 communicates with passage 170 to pressurize the clutch $CL_1$. That communication is established by one-way check valve 172. Thus the front clutch can be engaged with valve assembly 116 in the D position during operation in the low ratio, the second ratio and the third ratio.

When the manual valve is shifted to the L position, land 146 on the manual valve spool 144 moves to the left hand side of the port 174 so that passage 176 becomes pressurized. Both passages 166 and 176 communicate with the supply passage 102 through the space in the valve chamber 152 between the lands 146 and 148. Passage 134 also continues to be pressurized since it too communicates with that same valve space.

1-2 SHIFT AND 1-2 THROTTLE DELAY VALVE

Figure 4C:
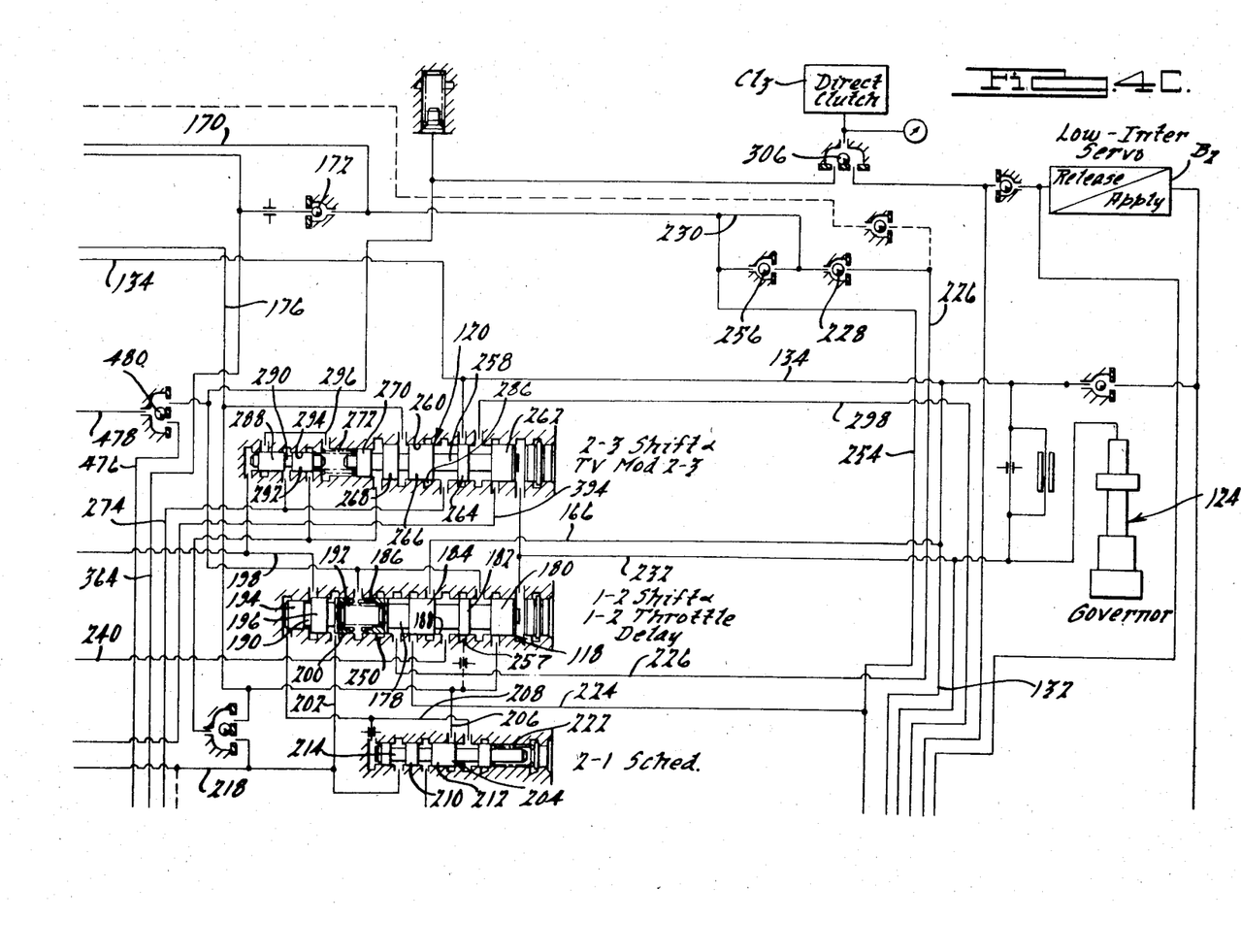

FIG. 4C shows the 1-2 shift and 1-2 throttle delay valve 118 which is in communication with passage 166. That passage is supplied with control pressure from the pump 38. Valve assembly 118 comprises a valve spool 178 having spaced valve lands 180, 182, 184 and 186. Valve spool 178 is situated in a valve chamber 188 that is occupied also by the throttle delay valve spool 190. Valve spring 192 separates the spools 190 and 178, the valve spools being aligned, one with respect to the other.

Valve spool 190 has valve lands 194 and 196 of differential area. The differential area defined by these lands is subjected to throttle valve limited pressure in passage 198 which communicates with the previously described throttle valve limited pressure passage 142. Throttle valve spool 190 has a third valve land 200 which is larger in diameter than land 196. It defines with land 196 a differential area that communicates with passage 202, which is subjected to a kickdown pressure passage from the 2-1 scheduling valve assembly 204.

Line pressure from passage 176 is fed to the valve assembly 204 through passage 206. That pressure is regulated by the 2-1 scheduling valve to produce a 2-1 downshift scheduled pressure in passage 208 which is distributed to the left hand side of the 1-2 delay valve spool land 194. The pressure in passage 202 or in passage 208 has the effect of increasing the effective force of spring 192 thereby increasing the 1-2 shift delay during acceleration from a standing start.

Throttle valve limiting pressure is distributed to the differential area of 2-1 scheduling valve lands 210 and 212 formed on 2-1 sc eduling valve spool 214. That throttle valve limiting pressure is distributed to the 2-1 scheduling valve through passage 216 which communicates with passage 142. The kickdown pressure that is distributed to passage 202 is received from kickdown pressure passage 218 which extends to kickdown pressure port 220 of the throttle plunger and control valve assembly 136. The force of the kickdown pressure and the throttle valve limiting pressure on the 2-1 scheduling valve is opposed by valve spring 222 so that the effective pressure in scheduling pressure passage 208 is a function of throttle position so that the 2-1 shift point can be controlled.

The right hand end of land 180 of the 1-2 shift and 1-2 throttle delay valve assembly 118 is subjected to governor pressure distributed to the assembly 118 through governor passage 232. The magnitude of the pressure in passage 224 depends on vehicle speed.

Figure 4D:
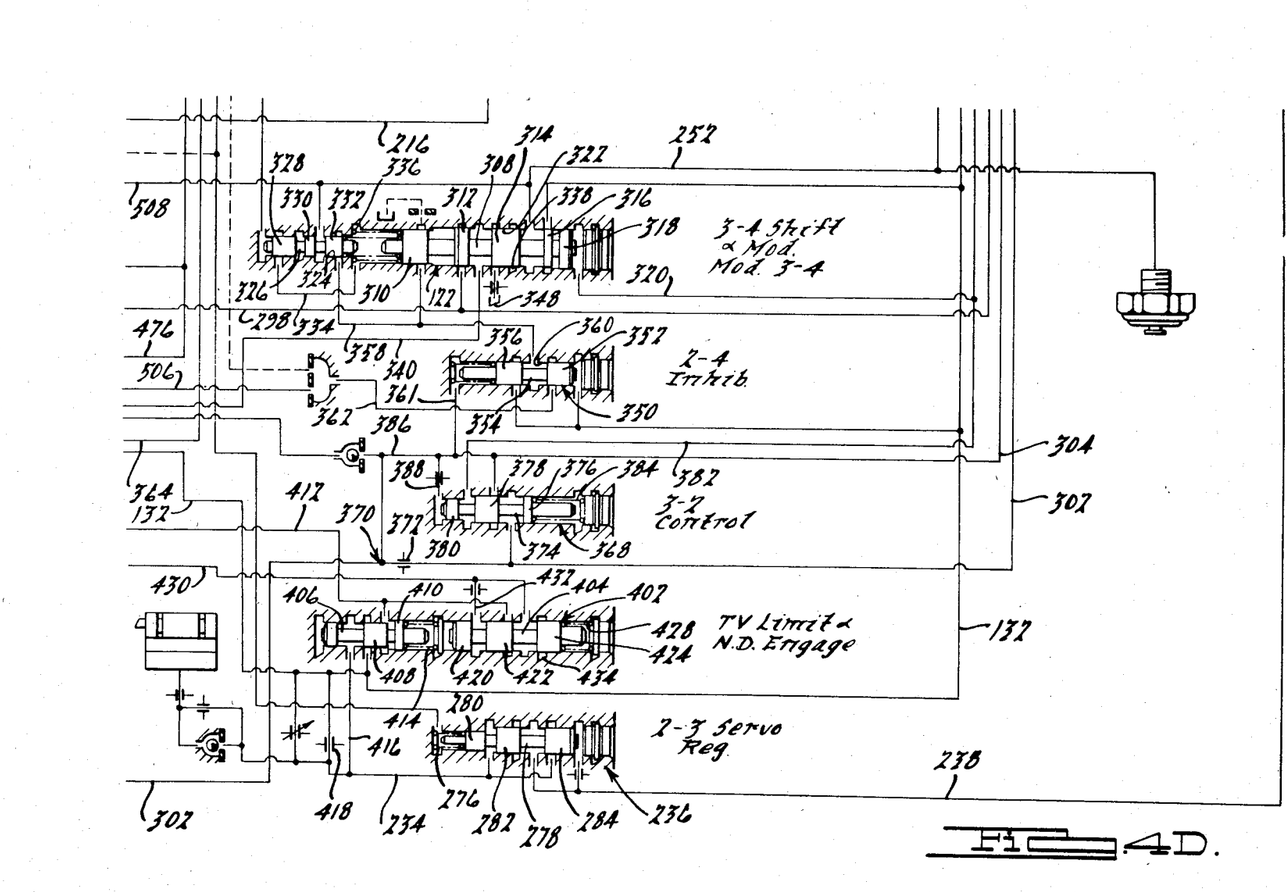

When the valve spool 178 is in its right hand position, line pressure from passage 166 is blocked by the land 184. The valve spool establishes communication, however, between passages 224 and 226 as the port communicating with passage 224 becomes uncovered by land 184. Passage 226 under these conditions communicates through the one way check valve 228 with passage 230, which in turn communicates with passage 170. Since passage 224 thus becomes pressurized, control pressure is distributed to the forward clutch speed passage 230 through the check valve 228 and through the double position check valve 156 located in passage 170. Line pressure, which is present in passage 134, is distributed to passage 132 and to passage 234 as seen in FIG. 4D. Communication is established by the 2-3 servo regulator valve assembly 236 with low-and-intermediate servo apply passage 238 which extends the low-and-intermediate servo $B_2$ as seen in FIG. 4C. Thus when the 1-2 shift and 1-2. throttle delay assembly 118 is in a right hand position, both forward clutch $CL_1$ and low-and-intermediate servo $B_2$ are applied. As indicated in FIG. 2, this effects a low speed drive mode.

When the governor pressure in passage 232 increases, the force acting on the right hand end of the valve spool 178 overcomes the force of spring 192 and the force of the throttle valve limiting pressure acting on the valve spool 190, thereby causing the valve assembly 118 to upshift to the second drive mode position as spool 178 shifts in a left hand direction. At that time line pressure passage 166 communicates with intermediate clutch feed passage 240. The line pressure signal then is delivered to port 242 of the main regulator and boost valve assembly 114, as seen in FIG. 4A, to effect a cutback in the magnitude of the line pressure maintained by the main regulator and boost valve assembly. The pressure in passage 240 is distributed also to intermediate clutch feed passage 244, which communicates with feed passage 248 for the 1-2 accumulator capacity modulator valve assembly 246 seen in FIG. 4B. The intermediate clutch $CL_2$ thus becomes applied as clutch $CL_1$ continues to be applied notwithstanding the communication established between feed passage 226 and exhaust port 250 of the 1-2 shift and 1-2 throttle delay valve assembly 118.

Passage 224 is pressurized by reason of the communication between line pressure passage 132 and passage 252 through the 3-4 shift and modulator valve assembly 122. Passage 252 communicates with passage 224 and with passage 254 which extends to the forward clutch feed passage 230. Check valve 228 closes since passage 226 is exhausted as does one way check valve 256.

Passage 240, which becomes pressurized on a 1-2 upshift as explained previously, communicates with exhaust port 257 and the valve assembly 118 when the valve 178 is in a right hand position.

2-3 SHIFT AND TV MODULATOR VALVE ASSEMBLY

Valve assembly 120 comprises a multiple land valve spool 258. It is slidably positioned in a valve chamber 260, which has internal valve lands that register with five valve spool lands identified by reference numerals 262, 264, 266, 268 and 270. Governor pressure from passage 232 is distributed to the right hand side of valve land 262. When the valve assembly in the downshift position, the force of valve spring 272 and the other hydraulic forces acting on the valve spool 258 overcome the force of the governor pressure in passage 232 and valve spool 258 assumes a right hand position, which corresponds to the intermediate speed ratio. At this time communication is established between line pressure passage 134 and passage 274, which communicates with the left hand side of the 2-3 servo regulator valve shown at 236 in FIG. 4D. This force supplements the force of valve spring 276 acting on valve spool 278 of the valve assembly 236.

The 2-3 servo regulator valve assembly comprises a small valve land 280 and larger diameter valve lands 282 and 284. Passage 274, which is pressurized when the manual valve is in the low range position or when the shift valves are in the first or second speed ratio positions, distributes pressure to the left hand side of the land 280 to augment the force of the spring 276 thus assuring that the valve spool 278 is in a right hand position. This establishes direct communication between passage 234 and the low-and-intermediate speed ratio apply servo feed passage 238. The 2-3 shift valve spool 258 is shifted in a left hand direction. Upon a 2-3 upshift, however, passage 274 becomes exhausted through exhaust port 286 in the valve assembly 120. This permits the 2-3 servo regulator valve to modulate the pressure in passage 238 and control the rate of release of the low-and-intermediate servo $B_2$ upon a 2-3 upshift.

The left hand side of valve land 288 of the 2-3 modulator valve is subjected to throttle valve limiting pressure distributed to it from passage 198. A companion valve land 292 is acted upon by valve spring 272 for the valve assembly 120. Valve lands 288 and 292 are disposed in valve chamber 294, which is aligned with valve chamber 260 for the valve assembly 120. Valve spool 290 on which the lands 288 and 296 are formed modulates the throttle valve limiting pressure to produce a modified 2-3 upshift pressure in crossover passage 296. When the force of governor pressure acting on the right hand side of the shift valve assembly 120 overcomes the opposing force of the spring 272 and the modified throttle pressure force in the spring chamber for spring 272, valve spool 258 shifts in a left hand direction. This establishes communication between line pressure passage 134 and passage 298. Passage 298 in turn communicates with passage 300, which communicates in turn with passage 302 through one way check valve 304 shown in FIG. 4B. Passage 302 extends to the release side of the low-and-intermediate servo $B_2$. Passage 302 in addition communicates with passage 304, as seen in FIG. 4D, and passage 304 supplies control pressure to the direct clutch $CL_3$ through the double position check valve 306 shown in FIG. 4C. As the release side of the servo $B_2$ becomes pressurized, the servo is released and fluid is exhausted from the apply side. Simultaneously the direct clutch $CL_3$ is applied as clutches $CL_1$ and $CL_2$ remain applied. Thus the transmission is conditioned for direct drive, third speed ratio operation.

3-4 SHIFT AND MODULATOR VALVE ASSEMBLY

The 3-4 upshifts and the 3-4 downshifts are controlled by valve assembly 122. This valve assembly comprises a valve spool 308 which has formed thereon spaced valve lands 310, 312, 314, 316 and 318. Governor pressure is distributed to the right hand side of the valve land 318 through governor pressure passage 320 which communicates with governor pressure passage 232. Valve spool 308 is positioned in a valve chamber 322 which has internal valve lands that register with the lands 310, 312, 314, 316 and 318. Aligned with the chamber 322 is a modulator valve chaxber 324 which receives valve spool 326. Throttle valve limiting pressure acts on the left hand side of valve land 328 for the valve spool 326. A second valve land 330 on the spool 326 and third land 332 form an area that is subjected to the pressure in passage 352, which is pressurized when the valve system is conditioned for full range operation in first, second or third speed ratio. The space between lands 328 and 326 is exhausted. Valve spool 326 modulates the pressure in the throttle valve limiting pressure passage 216 and the modified shift delay signal then is distributed to the left hand side of the valve spool 308 through crossover passage 334.

When the valve assembly 122 is in the upshift position, spool 308 is in a right hand direction thereby establishing communication between passage 252 and passage 132 as explained previously. When the force of the governor pressure in passage 320 is sufficient to overcome the opposing force of the spring 336 acting on the left hand side of the spool 308 and the opposing hydraulic forces on the modulator valve spool 326. The spool 308 will shift in a left hand direction which corresponds to the upshift condition. This exhausts passage 252 through passage 338 in the valve assembly 122. The forward clutch $CL_1$ thus becomes exhausted through the exhaust passage that now is defined by passage 170, passage 254, passage 252 and exhaust port 338. Passage 298, which is fed from passage 134 through the 2-3 shift valve, now communicates with passage 340 through the upshifted 3-4 shift valve assembly 122 as land 312 uncovers a port in the assembly 122 that communicates with passage 298.

Passage 340 communicates with overdrive servo feed passage 342, shown in FIG. 4B. The flow path to the overdrive servo includes orifice 344, thus delaying the rate of application of the overdrive brake. A one way check valve 346 in parallel with the orifice 344 permits rapid flow of fluid from the overdrive servo as a 4-3 downshift occurs. The exhaust flow path at that time includes the passage 340 and the exhaust port 348 in the valve assembly 122.

2-4 INHIBITER VALVE

Inhibiter valve assembly 350 shown in FIG. 4D controls upshifts from the second drive range directly to the overdrive range. It is effective to prevent or to inhibit such an upshift until the direct clutch pressure in passage 304 is sufficiently high to accommodate the torque requirements of the driveline. In this way the friction elements of the direct clutch $CL_3$ are protected from excessive energy dissipation and wear if the driving conditions are such that a 2-4 upshift is appropriate.

During operation in the first and second driving ratio, the direct clutch $CL_3$ is released. Thus the pressure in passage 304 is exhausted. Line pressure from passage 132 is applied to the right hand side of valve land 352 of the inhibitor valve assembly 350. Valve assembly 350 comprises valve spool 354 on which the land 352 is formed in spaced relationship with respect to companion land 356. Passage 358 extends from the valve chamber 360 for the valve assembly 350 at a location intermediate the lands 356 and 352 and extends to the valve chamber for the 3-4 modulator valve assembly and to the valve chaxber 322 for the 3-4 shift valve spool 308.

In those circumstances when the upshift from the second ratio to the fourth ratio is called upon, the throttle valve limiting pressure is relatively low and the valve spool 326 is shifted in a left hand direction. Communication then is established between passage 358 and the spring chamber for spring 336 between the valve spools 326 and 308. The pressure in passage 358 then forces the 3-4 shift valve spool 308 to maintain the third speed ratio position. When the clutch pressure in clutch $CL_3$ increases sufficiently, the pressure in passage 304, which is distributed to the left hand side of the valve land 356 through passage 361, will force the valve spool 354 in a right hand direction. This will allow passage 358 to be exhausted through the 3-4 inhibiter valve and through passage 362 and the 4-3 scheduling valve assembly shown at 130. Passage 364, which communicates with the valve assembly 130, serves as an exhaust passage under these conditions since it communicates with the open end of the manual valve assembly 116. Thus an upshift to the fourth ratio can be achieved without experiencing the problems associated with partial engagement of the clutch $CL_3$ due to insufficient clutch pressure.

3-2 CONTROL VALVE

Valve assembly 368 is a 3-2 control valve that controls the timing of the application of the intermediate servo $B_3$ and the release of the direct clutch $CL_3$ on a 3-2 downshift. Application of the intermediate servo $B_2$ is achieved by controlling the rate of displacement of fluid from the release side of the servo through passage 302 on a 3-2 downshift. Fluid pressure must be discharged from the direct clutch $CL_3$ and the release side of the intermediate servo $B_2$ through passages 302 and 304, respectively. Both of these passages 302 and 304 communicate with a common exhaust flow path on the downstream side of the juncture point 370 shown in FIG. 4D. To reach the juncture point 370 the fluid discharged from the release side of the servo $B_2$ must pass through flow restricting orifice 372. The balance of that fluid passes through the 3-2 control valve.

The 3-2 control valve comprises a valve spool 374 having three spaced lands 376, 378 and 380. A differential area is defined by the lands 378 and 380 and that area is in communication with governor pressure passage 332 through governor passage 382. The force of the governor pressure on that differential area opposes the force of valve spring 384 which normally urges the valve spool 374 in a left hand direction. An increase in governor pressure will progressively restrict communication between passage 302 and exhaust flow passage 386. The 3-2 control valve thus acts as a regulator valve as fluid on the downstream side of the 3-2 control valve is distributed to the left hand side of the valve spool 374 through feedback passage 388. At high vehicle speeds the governor pressure is sufficient to provide a relatively high restriction in the servo release flow path.

The exhaust flow path for the direct drive clutch and the release side of the servo $B_2$ on a 3-2 downshift includes passage 302 and orifice 390, one way check valve 392, passage 298, the 2-3 shift valve spool 258, passage 394 which communicates with the 2-3 shift valve chamber 260 and backout valve assembly 396. The backout valve assembly has a valve spool 398 that assumes a right hand position.

TV LIMIT AND NEUTRAL-TO-DIRECT VALVE ASSEMBLY

FIG. 4D shows at 402 a TV limit and neutral-to-direct engagement valve assembly. It includes a TV limit valve spool 404 and a neutral-to-direct engagement valve spool 406. Valve spool 406 comprises lands 408 and 410 that define a differential area that is in communication with throttle valve pressure passage 412 which communicates with the previously described throttle pressure passage 140 described with reference to FIG. 4A. Valve spring 414 urges the valve spool 406 in a left hand direction. At low throttle valve pressures spool 406 is stroked in a left hand direction thereby interrupting communication between passage 132, which is the main line pressure supply passage, and branch passage 416 extending to passage 234. Passage 234 communicates with passage 238 which supplies the apply side of the low speed servo $B_2$ through the 2-3 servo regulator valve. All of the fluid distributed from passage 132 to the apply side of the brake servo $B_2$ then must pass through flow restricting orifice 418, which bypasses the passage 416. When the vehicle is operated under torque, the TV pressure is sufficiently high to shift the valve spool 406 in a right hand direction thereby establishing communication between passages 132 and 234.

Located in axial alignment with the valve spool 406 is valve spool 404, which has three spaced lands 420, 422 and 424. Valve spring 426 urges the spool 404 in a left hand direction. When the valve spool 406 assumes the left hand direction, free communication is established between throttle pressure passage 412 and throttle valve limiting pressure passage 430, which communicates with throttle limiting pressure passage 142 described previously. Feedback passage 432 distributed the pressure in passage 430 to the left hand side of the land 420. An exhaust port is located at 434. The TV limit valve assembly, therefore, is capable of reducing the magnitude of the pressure developed by the throttle valve in passage 412 and provides a calibrated throttle valve limiting pressure in passage 430, which is distributed to the left hand end of each of the three shift valves described previously with reference to FIGS. 4C and 4D. This establishes the shift point for the various ratio changes. Shift points thus can be calibrated independently of the value of the throttle valve pressure in passage 412 that is required to maintain the proper regulated line pressure for the control circuitry.

THROTTLE VALVE ASSEMBLY

The throttle plunger and control valve assembly 136 comprises a valve sleeve 436 having internal lands that register with external lands on throttle valve spool 438. The lands for the valve spool 438 are shown at 440, 442 and 444. Valve spool 438 is urged in a left hand direction as seen in FIG. 4A by valve spring 446.

A throttle valve plunger 448 is arranged in axial alignment with the spool 438 and is separated from the spool 438 by valve spring 444. For an understanding of the mode of operation of a valve of this kind, reference may be made to U.S. Pat. No. 4,369,677, issued to Charles W. Lewis.

Plunger 448 has spaced lands 450 and 452 which define a differential area that communicates with throttle valve limiting passage 442 which establishes a force that augments the driver operated linkage force acting in a left hand direction on the plunger 448. The driver operated linkage is connected to the engine carburetor throttle for the internal combustion engine so that upon movement of the engine caburetor throttle to an open position the spring 446 becomes compressed.

Regulated line pressure from passage 202 is distributed to the valve assembly 136 through port 454. A throttle valve feedback passage 456 communicates with the differential area defined by lands 440 and 442. Thus the pressure in passage 140 is a pressure that is proportional to movement of the plunger 448 and hence it is proportional to the degree of opening of the engine carburetor throttle. In this respect it is generally proportional to engine torque.

MAIN REGULATOR AND BOOST VALVE ASSEMBLY

The valve assembly 114 shown in FIG. 4A regulates the pressure made available to the circuit by the pump 38. It includes a regulating valve spool 458 that has four lands 460, 462, 464 and 466. The output pressure passage 102 for the pump 38 communicates with the valve chamber that occupied by the valve spool 458. Feedback pressure passage 468 extends to the right hand side of the land 466.

Concentric valve springs 470 act on the left hand end of valve spool 458. The innermost spring of the concentric springs acts on a boost valve element 472 received in a sleeve 474. The left hand end of the spool 472 receives a modified throttle valve pressure from passage 476 which communicates with passage 478 through one way check valve 480. Passage 478 thus has a pressure that is generally related in magnitude to the engine torque, and upon an increase in torque the effective force that augments the force of springs of 470 increases to cause an increase in regulated line pressure maintained by the valve assembly 114. Boost valve element 472 includes also a differential area defined by spaced lands 480 and 482 which communicates with reverse line pressure passage 484. Passage 484 communicates with the reverse clutch. Thus whenever the reverse clutch is applied pressure is distributed to that differential area to augment the force acting on valve spool 458 in a right hand direction to further increase the magnitude of the circuit pressure level during reverse drive.

A pump control pressure passage 486 communicates with the valve chaxber for spool 458 adjacent land 460. That pressure is distributed to control chamber 488 in the variable displacement pump 338 thereby causing pivoting movement of the valve stator ring 106 about the pivot 108 to decrease the displacement of the pump and thereby maintain an upper limit on the magnitude of the regulated line pressure. Lubrication pressure passage 490 communicates with the valve chamber for the valve spool 458 intermediate lands 462 and 464 whereby the magnitude of the lube pressure in passage 490 is maintained at a desired level.

The differential area defined by lands 464 and 466, as previously mentioned, is in communication with passage 240, as explained previously, through port 242. But that port 242 is exhausted during low speed ratio operation as the 1-2 shift valve spool 178 moves to the downshift position. Thus a higher regulated line pressure is maintained during low speed ratio operation that during operation in the second, third or fourth speed ratio. The clutch and brake servos are thus effective to accommodate the higher torque capacity required for low speed ratio operation.

TV LINE MODULATOR AND 4-3 SCHEDULING VALVE

The valve assembly 130 includes a 4-3 scheduling valve spool 492 as seen in FIG. 4B. Spool 492 is located in a valve chamber 494 which is common to the valve chamber 496 for the TV line modulator valve spool 498.

Valve spool 492 has spaced lands 500, 502 and 504. Passage 364 serves as an exhaust passage since it is exhausted through the end of the manual valve assembly 116 in all positions except the D and L positions. Valve chamber 492 receives control pressure through the main control pressure passage 132 adjacent land 500. Passage 506 is the output pressure passage for the 4-3 scheduling valve. It receives from the 4-3 scheduling valve a reduced regulated pressure, the magnitude of which is the function of the rate of spring 508 acting on the valve spool 492 in a right hand direction as seen in FIG. 4B. Passage 506 distributes that regulated reduced pressure when the valve system is conditioned for first, second or third ratio operation to passage 362 and through the 2-4 inhibitor valve assembly 350, to passage 358 and the 3-4 modulator valve chamber 324. It thus develops a 4-3 shift point controlling pressure on the left hand side of the land 310 of the 3-4 shift valve spool.

When the transmission is in condition for third speed ratio operation, passage 508 is pressurized because it communicates with passage 252 that is pressurized when the 3-4 shift valve spool 308 is in the downshift position. This introduces a pressure force on the differential area of land 502 and 504 thereby modifying the effective regulated reduced pressure in passage 506 and establishing the proper 4-3 downshift point.

The throttle valve line pressure modulator valve spool 498 comprises lands 510, 512 and 514. Valve spool 8 is urged in a left hand direction by valve spring 516.

Figure 4E:
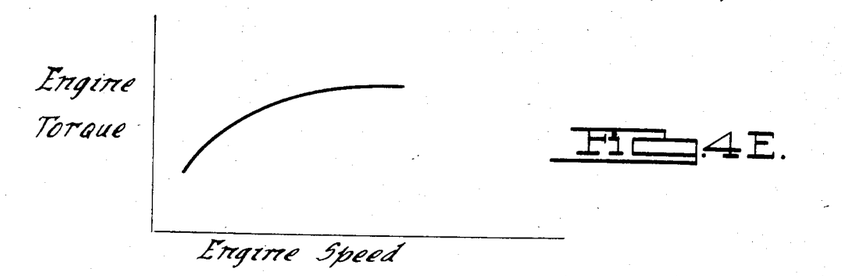
FIGS. 4E, 4F, 4G and 4H are charts showing the relationship between the engine speed-torque curve and the effective clutch and brake servo pressure for any engine throttle opening.

The TV line modulator valve is a regulator valve the exhaust port for which is shown at 518. The supply passage for the TV line modulator valve is the throttle valve limiting pressure passage 520, which communicates with the previously described passage 430. Valve lands 512 and 514 define a differential area that is acted upon by the throttle valve limiting pressure in passage 520. That pressure augments the force of the spring 516. The output pressure passage for the TV line modulator valve is passage 522 and a feedback branch passage 524 extends from the line 522 to the left hand end of the modulator valve spool 496. The throttle valve limiting pressure passage 522 extends to the passage 476 as explained previously which in turn communicates with passage 478 and the left hand end of the main regulator boost valve element 472. The TV line modulator valve in conjunction with the TV limit valve 434 is effective to distribute a regulator valve modifier pressure that enables the main regulator valve to develop a variable control pressure in the circuit that generally matches the characteristic shape of the engine speed torque curve for the engine with which the transmission is calibrated. The internal combustion engine characteristically has a curve similar to that shown, for example, in FIG. 4E.

Figure 4F:
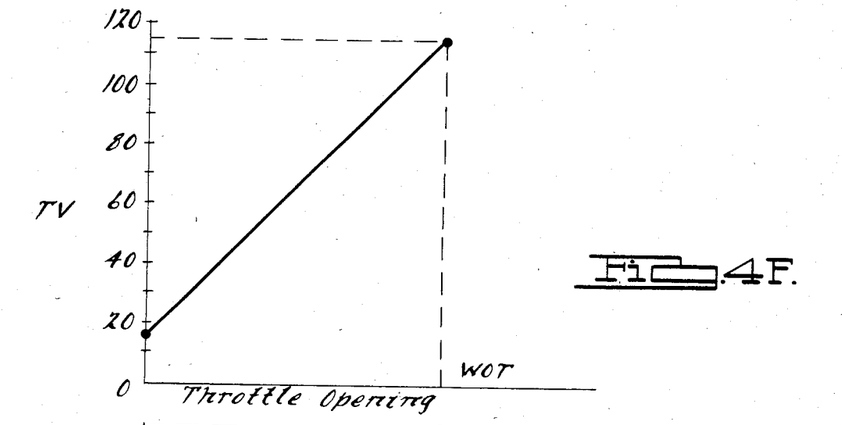

The relationship between engine carburetor throttle opening and the magnitude of the throttle valve pressure in passage 140 and in passage 412 is generally linear as indicated in FIG. 4F. At zero engine throttle the throttle valve pressure in a typical installation is about 15 psi. At wide open throttle a typical value for throttle valve pressure is 115 psi.

Figure 4G:
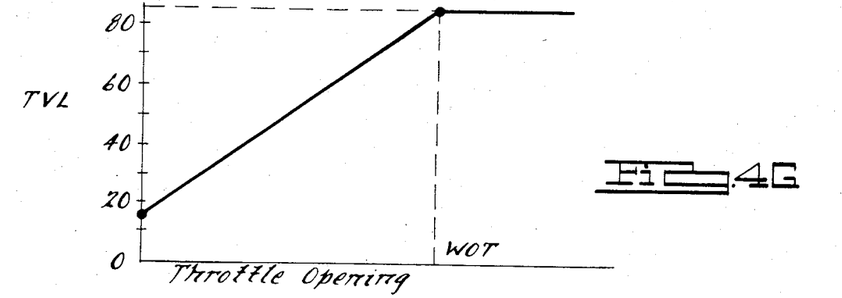

Throttle valve pressure is distributed to the TV limit valve through passage 412. The TV limit valve is in a left hand position because of the spring force of spring 428 when the throttle valve pressure is in a range of values between 15 psi and about 85 psi. Thus the output of the TV limit valve assembly 402 which is distributed to passage 430, is linear just as the throttle valve characteristic of FIG. 4F is linear. The relationship between throttle valve limiting pressure and throttle opening for the engine is indicated in FIG. 4G.

As indicated in FIG. 4D, throttle valve limiting pressure is applied to the throttle valve line modulator valve assembly 300 and it acts on the differential area of lands 512 and 514. This causes the valve spool 498 to modulate the pressure in passage 142 to produce a modified throttle valve limiting pressure in passage 476 which is distributed, as explained previously, to the left hand side of the boost valve element 572 of the main regulator valve 114.

Figure 4H:
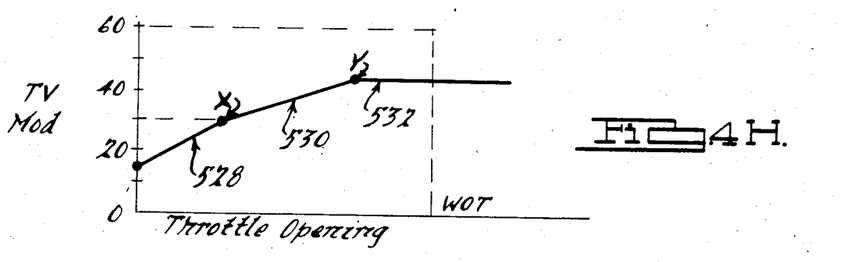
Figure 8:
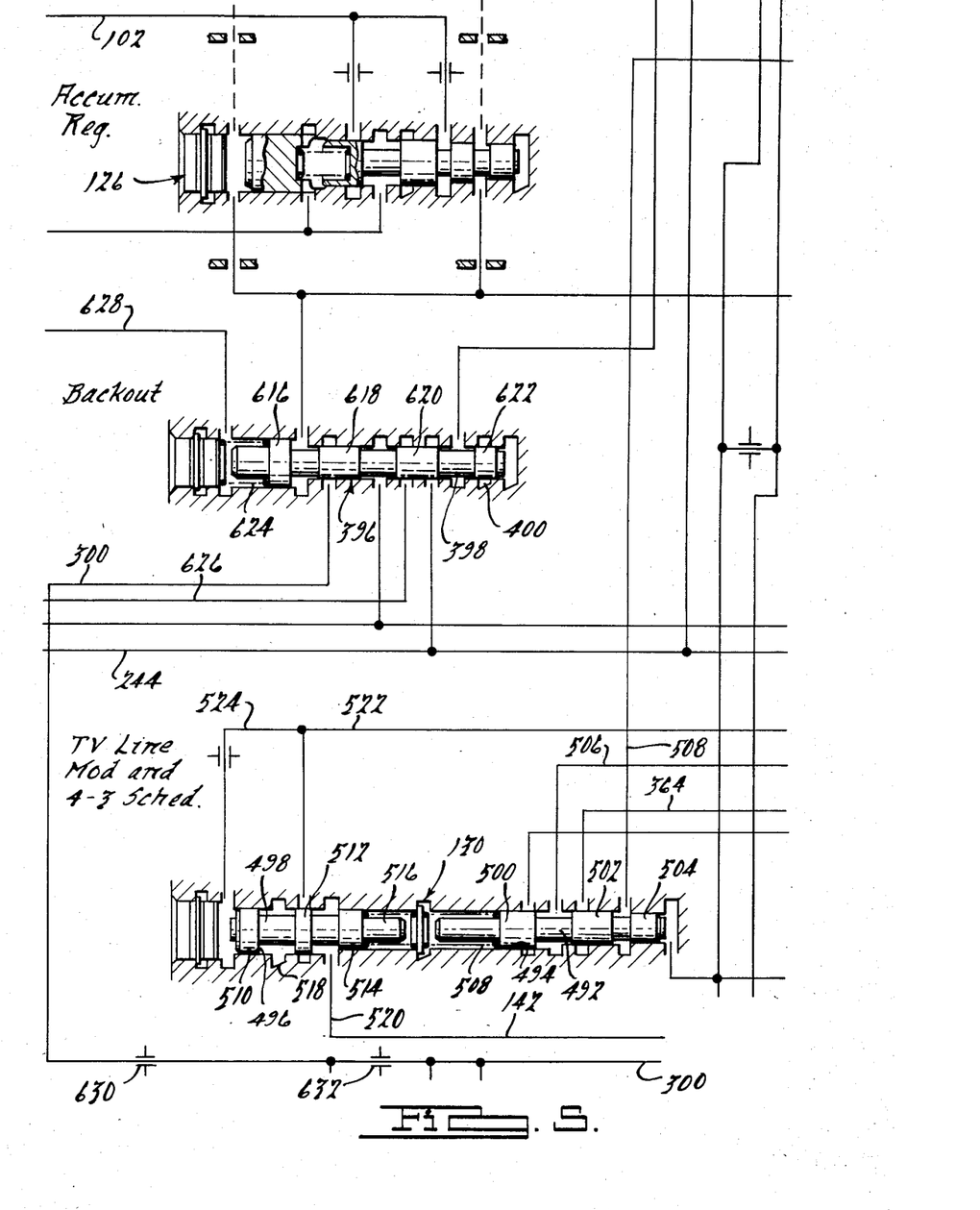

When engine throttle opening is plotted against throttle valve limiting modulated pressure, a relationship such as that shown in FIG. 4H is developed. Since initially the throttle valve limiting pressure equals throttle valve pressure, the portion of the curve shown at 528 is a straight line that generally is parallel to the throttle valve pressure line of FIG. 5F. When a throttle valve modulated pressure of about 30 psi is achieved, spring 508 begins to be compressed so that the throttle valve limiting pressure no longer equals the pressure in passage 522. The effective characteristic curve changes slope at this point as indicated in FIG. 4H. The change in slope is designated by point "X" in FIG. 4H. A further increase in the throttle valve modulated pressure continues along straight line portion 530 of the curve of FIG. 4H until point "Y" is reached at which time the throttle valve limit valve spool 404 begins to regulate throttle valve pressure as the spring 428 is compressed. This produces the brake point shown at point "Y" in FIG. 4H and thereafter the relationship between throttle valve modulated pressure and engine throttle opening is generally horizontal as shown by curve portion 532 until the wide open throttle position is reached. It may be seen that the curve of FIG. 4H generally approximates the engine torque curve of FIG. 4E. Thus the main regulator valve is capable of developing a circuit pressure that generally is related to the magnitude of the engine torque at any given speed.

BYPASS CLUTCH CONTROL AND CONVERTER REGULATOR

The converter lockup clutch is controlled by a bypass clutch control shown in FIG. 4A. It includes a multiple land valve spool 530. Four valve lands are formed on the valve spool 530 as shown at 532, 534, 536 and 538. Valve spool 530 is slidably positioned in valve chaxber 540 which has internal valve lands that register with the lands 532, 530, 534, 536 and 538.

The bypass clutch control is fed with regulated pressure from the main regulator and boost valve assembly 114 through passage 542, which communicates with the main regulator valve at a location intermediate lands 462 and 464. An exhaust port 544 registers with the main regulator valve chaxber, and a feedback branch passage 546 for the main regulator valve spool supplies the feedback pressure that opposes the force of the spring 470. Thus a calibrated pressure is obtained in passage 486 for pump displacement control purposes and a converter feed pressure in passage 542 is a separately regulated pressure. Passage 542 communicates with passage 548 across orifice 550.

The feed passage 552 for the converter power inlet communicates with passage 548 across orifice 554. The converter flow return passage from the turbine side of the converter is shown at 556. Flow control orifice 558 connects passage 556 with the front lubrication circuit 560. A lube pressure check valve 562 is located in the passage 560. The outlet side of the valve 562 is connected to the transmission cooler 564 which supplies the front lube circuit 566.

When the converter bypass clutch is disengaged, the valve spool 530 of the bypass clutch control is in a right hand position which establishes a connection between passage 556 and passage 560 as land 538 uncovers the valve port in chamber 540 that is connected to passage 560. This effectively bypasses the orifice 558.

In the clutch release position described above land 534 uncovers the port in valve chaxber 540 that communicates with branch passage 568 thereby establishing communication between passage 548 and converter bypass flow passage 570 through the branch passage 568.

The converter bypass clutch 28 includes a clutch diaphragm 570 extending in a radial direction. It cooperates with impeller housing 572 to define a radial outflow passage connecting the passage 570 with the interior of the torus circuit. Thus when the clutch is disengaged both passages 552 and the clutch bypass passage 570 act as converter flow inlet passages while passage 556 serves as a flow return passage.

Control pressure distributed to the left hand end of valve plug 574 from passage 102 establishes a pressure force on a plug which is transmitted to the valve spool 530 to lock it in the unclutched position. If a control signal is distributed to the solenoid pressure line 576, pressure is distributed to the right hand end of land 538 which causes the valve spool 530 to shift in a left hand direction, which corresponds to the locked clutch condition. The valve port which communicates with passage 548 then is uncovered by land 536 and converter pressure fluid then passes from passage 542 through the orifice 550 and through the companion orifice 578 to the passage 580, which extends to the cooler 564 and the front lube circuit 566. Simultaneously, the port communicating with branch passage 568 is brought into communication with passage 582. Bypass pressure passage 570 is brought into communication with exhaust passage 584, which communicates with the exhaust end of the manual valve assembly. The converter feed path then includes passage 548, passage 568, passage 582 and passage 552. Passage 556 continues to function as a flow return passage from the turbine side of the converter. All of the fluid returned to the front lube circuit when the clutch is locked must pass through the flow restricting orifice 558. A back pressure then is developed in the torus circuit which acts on the clutch plate 570 causing the clutch 28 to engage thereby locking the converter turbine with the converter impeller.

The solenoid pressure in passage 576 is controlled by a converter bypass solenoid 586, as seen in FIG. 4B. The solenoid is under the control of a power train electronic control module 588 shown in FIG. 3. The module establishes a pulse width modulation characteristic in response to input signals to develop a desired pressure in passage 476. The input signals for the module 588 may be analog signals representing engine input speed, throttle position for the engine carburetor, engine temperature, vehicle speed. A wheel brake signal is used also. It is active when the wheel brakes are applied so that the module will cause the solenoid to be disabled thereby exhausting the passage 576 and unlocking the converter when the vehicle is braked. This avoids stalling of the engine when the wheel brakes are applied while the transmission is in a cruising, converter lockup drive condition. The output from the module 588 is a signal used by the on/off bypass solenoid 586 to establish a desired pressure level in passage 576. Governor output indicated in FIG. 3 is a self-test diagnostic output signal.

When the signal in passage 576 is above a special value, the bypass control clutch valve element 530 is shifted to a locked condition in a left hand direction. If the signal in passage 576 is lower than a low threshold value, the bypass clutch control valve spool 530 is shifted fully to its right hand clutch unlocked position. For values of pressure in passage 576 between the upper threshold value and the lower threshold value, a variable pressure in the clutch bypass control circuit is developed which in turn results in a varying clutch capacity for the lockup clutch 28. The clutch capacity can be matched with the optimum clutch capacity that is dictated by any given engine speed throttle position, engine temperature and vehicle speed.

Passage 590 shown in FIG. 4A is a lube passage that is separate from the front lube circuit. It is identified in FIG. 4A as a rear lube circuit. The rear lube circuit is fed through orifice 592, which is in communication with the previously described passage 548. The added lube capacity for the transmission system made available by the two independent lube circuits provides better lubrication and better durability since it is not necessary to rely on a single flow path through the torque converter to establish lubrication at the various transmission lubrication points. One lubrication flow path is from the cooler return circuit and the other is from the converter charge circuit.

The converter bypass solenoid valve is a normally open valve comprising orifice 594 and solenoid actuated armature valve element 596. Solenoid orifice 594 is supplied with pressure from passage 302 through filter 598 and through flow restricting orifice 600. Passage 302 is pressurized whenever the release side of the intermediate servo B$_2$ is pressurized. This condition exists only during third or fourth speed ratio operation. Thus it is possible for the lockup clutch to be engaged only during operation of the driveline in the third or fourth ratio.

The pressure level in the torus circuit of the impeller housing is maintained at a desired level by converter regulator valve 602 which comprises a regulator valve spool 604 with spaced lands 606, 608 and 610. Valve spool 604 is urged in a right hand direction by valve spring 612. Lands 608 and 610 define a differential area that receives pressure from passage 548. The force of that pressure is opposed by spring 612. The exhaust port for valve 602 is shown at 614. The pressure maintained in passages 548 and 552 is a reduced pressure that is dependent on the spring force and the differential area of lands 608 and 610.

PARTICULAR DESCRIPTION OF THE VALVE CIRCUIT OF FIG. 5

The backout valve 396 has four spaced valve lands on its valve element 398, as shown at 616, 618, 620 and 622. Valve element 398 is biased in a right-hand direction, as viewed in FIG. 5, by valve spring 624. Passage 298 communicates with the valve chamber for valve 396 at a point intermediate the lands 616 and 618, the diameter of the land 616 being larger than the diameter of land 618. Thus, when the passage 298 is pressurized, the valve element 398 is shifted in a left-hand direction against the force of spring 624. The valve element 398 assumes that position except during a backout drive mode, which will be explained subsequently.

Passage 300 communicates with the valve chamber for backout valve 396 adjacent land 618. It is blocked by the land 618 when the valve element 398 is shifted in a left-hand direction and communicates with passage 298 when the valve element 398 is moved in a right-hand direction.

Passage 340 communicates with the valve chamber for the backout valve 396 at a point between lands 618 and 620. Passage 340 is brought into communication with passage 626 when the backout valve element 398 is shifted in a right-hand direction causing passage 626 to be uncovered by valve land 620.

Passage 394 communicates with the backout valve 396 at a point intermediate lands 620 and 622. When the element 398 is shifted in a left-hand direction, communication is established between the passage 394 and passage 44. When the valve element 398 is shifted in a right-hand direction, passage 394 is exhausted through the exhaust port 400 in the backout valve 396.

Backout valve 396 is supplied with backout pressure at its left-hand end through backout pressure line 628. When passage 628 is pressurized, a force is applied to the valve element 398 that supplements the force of the spring 624, tending to shift the valve element 398 in a right-hand direction. Passage 628 communicates through two-way check valve assembly 631, shown in FIG. 4A, with passage 632 which communicates with the right-hand end of the throttle plunger and control valve, also shown in FIG. 4A.

Under light throttle operating conditions or when the engine is operated at its idle throttle setting, valve plunger 448 is moved in a right-hand direction so that land 450 on the plunger uncovers passage 632 and causes passage 632 to be exhausted through the spring chamber for spring 446 of the throttle plunger and control valve assembly. Under these conditions, the backout valve element 398 is stroked in a left-hand direction assuming that the passage 298 is pressurized. On the other hand, when the throttle valve plunger 448 is moved toward an advanced throttle position, land 450 uncovers passage 632, thereby establishing communication between passage 632 and limited throttle pressure passage 142. This causes passage 632 to be subjected to limited throttle pressure, thereby causing valve element 398 to shift when the throttle pressure is sufficient to overcome the opposing hydraulic pressure force of the pressure in passage 298.

DESCRIPTION OF THE FUNCTION OF THE BACKOUT VALVE

During heavy throttle operation as the vehicle is accelerating from the lowest ratio to the highest ratio, the backout valve is effective to control heavy throttle 2-3 upshifts. Under these conditions passage 628 is pressurized, as explained previously, so the valve element 398 is stroked in a right-hand direction. This establishes communication between passage 298 and passage 300.

A flow control orifice 630 is located in passage 300, the downstream side of the orifice 630 communicating with passage 302 through one-way check valve 304. Passage 300 also communicates with the passage 300 through a second flow controlling orifice 632. Thus the pressure in passage 300 is distributed to passage 302 through both orifices 630 and 632 when the valve element 398 is stroked in a right hand direction, which would correspond, as explained previously, to a heavy throttle 3-2 upshift. Thus when the 2-3 shift valve element 258 is shifted to its upshift position upon an increase in governor pressure in passage 232, line pressure passage 134 is brought into communication with passage 132 thereby pressurizing the latter. That pressure then is distributed through passage 298 and through the backout valve assembly 396 to the passage 300 on the upstream side of the orifice 630. Thus the passage 302 is supplied with fluid from both the orifice 630 and the orifice 632 under these heavy throttle 2-3 upshift conditions. This delays the application of the direct drive clutch and the release of the intermediate servo, the latter being in communication with the direct drive clutch through a common feed passage 304. Passage 304 in turn communicates with passage 302 at the hydraulic connection point 370. Because of the delay in the full application of the clutch with respect to the release of the brake, the rotating elements of the direct drive clutch will have sufficient time to achieve synchronism thus avoiding undue inertia forces and harshness in the ratio change.

If a 2-3 upshift should occur under closed throttle conditions or under light throttle conditions, the backout valve pressure in passage 628 is insufficient to keep the valve element 398 in its right hand position. Thus the valve land 618, upon movement of the valve element 398 in a left hand direction, will block passage 300. This blocks the feed for the orifice 630. Thus the passage 300 and the passage 298 communicate with the clutch feed passage 302 through the single orifice 632. This delays the application of the direct clutch and the release of the low and intermediate servo B2.

The back-out valve assembly is capable also of controlling a light throttle 3-4 upshift as well as a heavy throttle 3-4 upshift so that the timing of the 3-4 ratio change can be tailored to accommodate the torque requirements for both heavy throttle and light throttle conditions, thereby making it possible to calibrate the system for maximum smoothness in the ratio change. Upon a light throttle 3-4 upshift, the 3-4 shift valve assembly 122 shifts in a left hand direction. The 3-4 shift valve assembly is fed from the 2-3 shift valve assembly which, under these conditions, is in its upshift position. Thus line pressure passage 134 is in communication with the 3-4 shift valve feed passage 298 through the 2-3 shift valve assembly. Passage 298, upon a 3-4 upshift, communicates with passage 340 through the 3-4 shift valve assembly as land 312 uncovers the connection with passage 298.

Since passage 298 becomes pressurized in this manner, it feeds the overdrive servo B1 through orifice 344 and the feed passage 342. Thus all the pressure delivered to the overdrive servo must pass through the orifice 344. Under these conditions land 620 of the backout valve blocks passage 626. On the other hand during a heavy throttle 3-4 upshift the pressure in passage 628 is capable of shifting the valve element 398 in a right hand direction, thereby establishing communication between passage 340 and passage 626. This provides a parallel feed passage to the overdrive servo since the passage 626 communicates with the overdrive servo through orifice 345. The overdrive servo then will become applied more quickly under heavy throttle 3-4 upshift conditions than it would be applied during light throttle 3-4 upshift conditions. Thus the timing of the 3-4 upshift can be controlled to meet the torque requirements of the driveline for both light throttle conditions and heavy throttle conditions and this control is achieved by the backout valve without adding any unique valve elements or significant added circuit structure.

The back-out valve also is capable of functioning as a power-on 3-2 downshift control when a downshift occurs with intermediate or advanced throttle settings. Under these conditions backout pressure in passage 628 is sufficient to cause the valve element 398 to shift in a right hand direction. This uncovers exhaust port 400 so that passage 394 is exhausted through the backout valve through the exhaust port 400.

The 2-3 shift valve assembly 120 connects passage 298 to passage 394 when it assumes the second ratio position. Passage 394 is exhausted through the backout valve exhaust port 400, as explained previously. Passage 298 is connected to the direct clutch CL3 through the passage 300, through the check valve 392, orifice 390, passage 302 and passage 304, the latter extending to the direct drive clutch CL3 and also to the release side of the intermediate brake servo B2 through passage 302. The connection between passage 302 and passage 304 is shown at 370.

On light throttle 3-2 downshifts, the backout valve element 398 is shifted to the left as the pressure in passage 628 is reduced as explained previously. When this occurs, the passage 244 becomes connected to passage 394 through the backout valve assembly, and exhaust port 400 becomes blocked. Passage 394 then becomes pressurized which disables the 2-3 shift valve. Thus the 2-3 shift valve is capable of moving from its left hand position to its right hand position without having any effect on ratio changes. Passage 394 no longer can be selectively pressurized and exhausted by the 2-3 shift valve since it is continuously pressurized by the backout valve assembly. Since the vehicle is coasting down with minimum throttle setting, no ratio change occurs upon movement of the 2-3 shift. Rather the downshift is controlled by 1-2 shift valve assembly. If the speed during coasting falls below the shift point value, passage 240 becomes connected to vent 258 in the 1-2 shift valve assembly. This causes the intermediate clutch CL2 to become exhausted since the feed passage 248 for the intermediate clutch is connected to the passage 244 through the 1-2 capacity modulator 246.

The 1-2 accumulator capacity modulator valve 246 comprises a valve spool 634 that is biased in an upward direction by valve spring 636. When the valve spool 634 is shifted upward, communication is established between passage 240 and passage 248 leading to the clutch CL2 as pressure builds up. The pressure in the clutch CL2 is distributed to the upper end of the valve spool 634 thereby progressively restricting the communication between passages 240 and 248. The pressure acting on the lower end of the valve spool 634 is the pressure on the downstream side of flow control orifice 638, which is used to stroke the piston 640 of 1-2 accumulator 642 against the opposing force of accumulator valve spring 644. After the accumulator 642 is stroked fully, flow across the orifice 638 no longer occurs and the pressure on the lower side of the valve spool 634 balances the force on the upper end of the valve spool so that the valve spool shifts upwardly to its original position.

Having described a preferred embodiment of my invention, what I claim and desire to secure by U.S. Letters Patent is:

1. In a control system for an automatic transmission for an automotive vehicle, said transmission having a torque input shaft, a torque output shaft, a hydrokinetic torque converter with an impeller connected to the torque input shaft and a turbine, and multiple ratio gearing having an input element connected to said turbine and an output element connected to said output shaft;

first clutch and brake means for controlling the relative motion of the elements of said gearing to establish and disestablish ratio changes between a fourth speed ratio and a third speed ratio;

Second clutch and brake means for controlling the relative motion of the elements of said gearing to establish and disestablish ratio changes between a second speed ratio and said third speed ratio;

third clutch and brake means for controlling the relative motion of the elements of said gearing to establish and disestablish ratio changes between a first speed ratio and said second speed ratio;

fluid pressure actuators for each of said clutch and brake means;

a fluid pressure pump;

conduit structure connecting said pump and said actuators including a 1-2 shift valve means for controlling selectively distribution of actuating pressure to the actutor for said third clutch and brak means, a 2-3 shift valve means for controlling selectively distribution of actuating pressure to the actuator for said second clutch and brake mans and a 3-4 shift valve means for controlling selectively distibution of actuating pressure to the actuator for said first clutch and brake means;

a source of a pressure signal proportional in magnitude to input torque and a source of a pressure signal proportional in magnitude to output shaft speed;

said signal sources being in communication with said shift vale means;

a backout valve means for controlling the rate of response of the actuators to shifting of said 2-3 shift vale means to a third speed ratio condition from a second speed ratio condition, said backout valve means comprising a backout valve element in said conduit structure that is movable from a first position to a second position, said torque signal source communicating with said backout valve element whereby the latter is urged to its second position;

flow control orifices in said conduit structure communicating with said backout valve means in parallel relationship, one with respect to the other, said orifices being located in the pressure distribution path of said conduit structure position that feeds said second clutch and brake means;

both control orifices being effective to control actuator pressure for said second clutch and brake means when said backout valve element assumes its second position and one orifice being effective to control actuator pressure for each second clutch and brake means when said backout valve element assumes its first position.

2. The combination as set forth in claim 1 wherein said backout valve means is in the conduit structure portion that feeds the said first clutch and brake means, the latter conduit structure portion having two orifices in parallel, one of said two orifices communicating with a high pressure region of said conduit structure through said backout valve means when said backout valve element is in its first position and the both of said two orifices communicating with said high pressure region when said backout valve element is in its second position.

3. The combination as set forth in claim 1 wherein said backout valve means includes an exhaust port that communicates with said 1-2 shift valve means whereby the actuator for said third clutch and brake means is exhausted through said backout valve means on a ratio change from the second speed ratio to the first speed ratio under torque.

4. The combination as set forth in claim 2 wherein said backout valve means includes an exhaust port that communicates with said 1-2 shift valve means whereby the actuator for said third clutch and brake means is exhausted through said backout valve means on a ratio change from the second speed ratio to the first speed ratio under torque.

5. The combination as set forth in claim 3 wherein said 2-3 shift valve means includes a pressure supply passage, a pressure delivery passage communicating with the actuator for said second clutch and brake means and an exhaust passage;

said backout valve means communicating with said exhaust passage and being adapted to connect the same to a high pressure region of said conduit structure when said backout valve element is shifted to its first position whereby said 2-3 shift valve means is disabled upon a light throttle downshift from the third ratio thus effecting an automatic ratio change from the third speed ratio directly to the first speed ratio upon downshifting movement of said 1-2 shift valve means.

6. The combination as set forth in Claim 4 wherein said 2-3 shift valve means includes a pressure supply passage, a pressure delivery passage communicating with the actuator for said second clutch and brake means and an exhaust passage;

said backout valve means communicating with said exhaust passage and being adapted to connect the same to a high pressure region of said conduit structure when said backout valve element is shifted to its first position whereby said 2-3 shift valve means is disabled upon a light throttle downshift from the third ratio thus effecting an automatic ratio change from the third speed ratio directly to the first speed ratio upon downshifting movement of said 1-2 shift valve means.

* * * * *